Jan. 19, 1971     J. C. PROCTON     3,555,612

GUIDE ROLLER ASSEMBLY

Filed Sept. 25, 1967

*INVENTOR.*
JEROME C. PROCTON

United States Patent Office 3,555,612
Patented Jan. 19, 1971

3,555,612
GUIDE ROLLER ASSEMBLY
Jerome C. Procton, 5000 Manning Drive,
Greensboro, N.C. 27410
Filed Sept. 25, 1967, Ser. No. 670,057
Int. Cl. E05d 13/02
U.S. Cl. 16—105
1 Claim

ABSTRACT OF THE DISCLOSURE

A self-lubricating roller assembly in which a plastic guide roller is rotatably mounted on an annular plastic axle member with the roller and axle member being cooperatively secured together by means of a flanged pin limiting axial displacement of the axle member and roller with the assembly being mounted on a support.

BACKGROUND, BRIEF SUMMARY AND OBJECTIVES OF THE INVENTION

Conventionally, rollers for providing smooth reciprocating movement of drawers or doors relative to fixed cabinets or closets have generally been fixedly mounted to the appropriate supporting structure thereby making the original installation relatively permanent and replacement somewhat difficult.

Formerly, guide roller construction was such that occasional lubrication of moving parts was required in order to prevent rust, squeaking or faulty operation when the drawers or doors of cabinets or closets were operated. Many improvements have been made in roller assemblies by the use of plastic molded components as shown in U.S. Pats. 2,912,288; 3,164,418; 3,199,930; and 3,215,476, among others.

The roller assembly of the present invention overcomes the disadvantages set forth above by embodying a design suitable for releasable mounting onto a supporting member so as to simplify greatly the mounting or replacement of the assembly. Additionally, the roller assembly of the present invention is constructed by materials having inherent characteristics which provide self-lubrication for the moving parts.

The present guide roller assembly includes generally a flange plate having screw-receiving openings positioned within so as to allow easy installation and expeditious adjustment of the assembly by merely loosening the retaining screw or screws should that operation become necessary. The assembly further contains a stationary axle member secured to the flange, a guide roller rotatably mounted on the axle member which may have a circular recess along its axis to house an extending headed portion of an axle member, and a securing headed rivet or pin for securing the entire assembly to a flange or other support member. As the guide roller is preferably formed of nylon and the axle member preferably formed of "Delrin," these two substances with their inherent lubricating properties avoid many of the disadvantages of contacting metal parts when relative motion between the two occurs. Preferably, the guide roller and axle member are molded components permitting loose tolerances between the two components.

Accordingly, it is an object of the present invention to provide a guide roller assembly of the type described which can be easily installed and expeditiously adjusted and replaced without replacement of the entire device.

Another object of the present invention is to provide a guide roller assembly of the type described having a stationary axis which is suitably housed within a guide roller rotatably mounted about that axis, the two components being constructed of plastic materials which have inherent lubricating properties.

A further object of the present invention is to provide a roller assembly of the type described which can be secured to the adjustable flange by means of a single standard rivet in a simple and straightforward manner without the necessity of shouldering or shaping the rivet for a particular application.

These and other objects of the present invention will become more apparent from a consideration of the following detailed specification taken in conjunction with the accompanying drawings wherein like characters of reference designate like parts throughout the several views.

FIGURE DESCRIPTION

DETAILED DESCRIPTION OF THE DISCLOSURE

Figure 1:
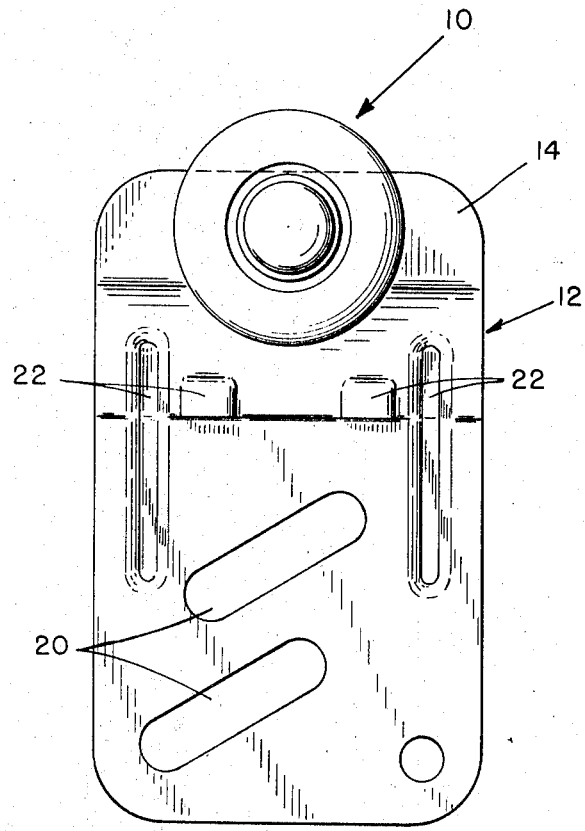
FIG. 1 is a front elevational view of a guide roller assembly of the present invention mounted on a supporting flanges.
Figure 2:
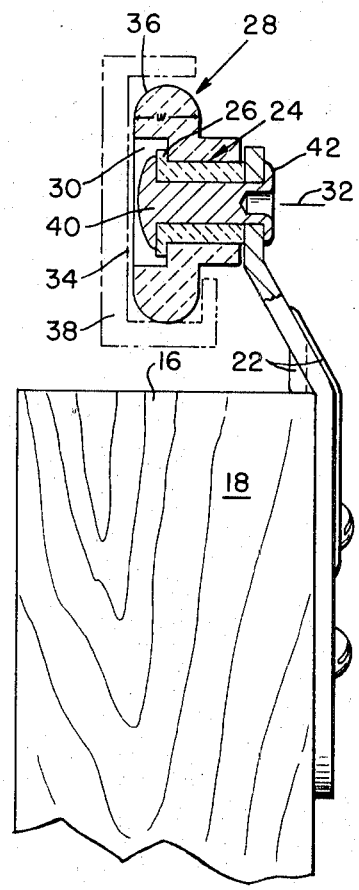
FIG. 2 is an end elevational sectional fragmentary and end view of the roller assembly of FIG. 1 mounted to a support showing the guide roller retained on the axle member, both components of which are then secured to the flange by means of a standard rivet.
Figure 3:
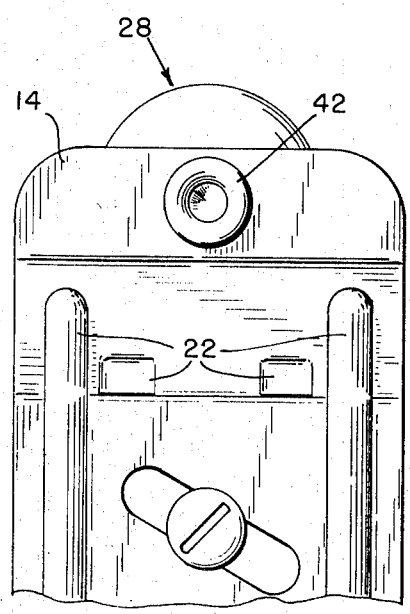
FIG. 3 is a partial rear elevational view of the guide roller assembly of FIG. 1 showing the flange-securing screw and the roller and axle member retaining rivet.
Figure 4:
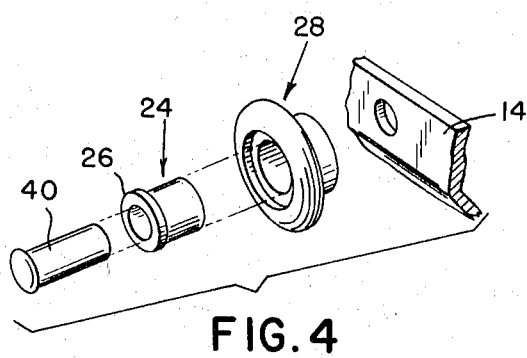
FIG. 4 is a perspective, exploded view of the guide roller assembly and a portion of the flange to which the assembly is affixed.

Referring now to the drawings and particularly to FIG. 1, a roller assembly generally designated 10 has an adjustably positionable flange 12 which is substantially rectangular in shape and has a top portion 14 which is offset to the extent that, when installed, the carried components of the assembly will be positioned generally in the center 16 of a supporting member 18 such as illustrated in FIG. 2. The flange 12 has a number of angularly extending screw-receiving slots 20 which permit incremental horizontal and vertical positioning of the flange and the carried components to the extent necessary for making fine adjustments of the assembly with respect to the supporting member 18 and the related drawer, cabinet, or closet to which the supporting member may be secured. A number of ribs or indentures 22 strengthen the flange along the offset portion and provide securing lugs to align and tighten the assembly with respect to the supporting member 18.

An annular axle member generally designated 24 is secured to the flange 12 along its upper portion 14 in a manner subsequently to be described. The axle member 24 has, at its extending end, a roller-retaining hub 26, while the remaining portion of the axle 24 is straight and provides means upon which the additional components to be described will rest and rotate.

A guide roller shown generally as 28 is rotatably mounted on the axle member 24 and is preferably held on the straight portion of the axle member 24 by the retaining hub 26 in the manner shown particularly in FIG. 2 though a separate pin having an enlarged head might be used which would eliminate the requirement of the hub. The roller, which may be molded, has a circular recess 30 which is centered at the axis 32 of the roller and receives the roller-retaining hub 26 of the axle member 24, which may also be molded of plastic, below the external surface 34 of the roller. The external configuration 36 of the roller is preferably though not necessarily circular in cross section, and the width "W" of the roller is such as to fit securely within a cooperating track 38 shown in broken lines in FIG. 2 for easy rotation of the roller and unrestricted movement of the carried supporting member 18 in the manner shown.

A separate pin 40, normally a standard or conventional headed rivet, is used to secure the axle member 24 to the upper portion 14 of the flange 12 so that the axle member will remain stationary at all times. By securing the axle member 24, the pin 40 thereby holds the guide roller 28 in rotatable relationship with the axle member 24 though it remains isolated from the guide roller and preferably completely within the recess 30 to avoid contacting externally any portion of the track 38. The rivet free end 42 is peened or braded in a conventional manner to retain the components against the upper portion 14 of the flange 12. The present construction has the additional advantage of eliminating any close tolerance requirements since the rivet 40 may be forced into the axle member without any concern that the dimensions be such as to permit rotation of the axle about the rivet. Rotation may or may not occur but either event does not affect the functioning of the assembly.

It has been found preferably to form the axle member 24 of a plastic material such as "Delrin" or polyethylene and the guide roller 28 of nylon or polyethylene since these materials have inherent lubricating properties which eliminate the need for separate periodic lubrication.

While there has been described in detail a preferred embodiment of the present roller assembly, obviously many modifications and variations may be made in the configuration of the axle member, the guide roller and the securing pin as well as other phases of the present inventive concept without departing from the real spirit and purpose of this invention and such modifications as well as the use of mechanical equivalents to those herein illustrated are contemplated.

What is claimed is:

1. A self-lubricating roller assembly comprising: a stationary annular plastic axle member, said axle member having an enlarged portion at one end thereof forming a limiting displacement shoulder, a nylon plastic guide roller having an axle-receiving opening rotatably mounted on said axle member, said roller having a substantially half-round outermost perimeter in cross section and an axially projecting cylindrical portion offset to one side of said outermost perimeter for bearing engagement on said axle member, said guide roller having an enlarged recess portion at one end thereof for cooperatively receiving said enlarged portion of said axle member, a headed rivet in said axle member for limiting axial displacement of said roller on said member, and an adjustably positioned flange securable to a supporting member wall for receiving said rivet, said flange including spaced, parallel indentures extending from said flange and positioned intermediate spaced, parallel strengthening ribs for initially aligning the assembly with respect to the supporting wall means, said flange defining spaced, parallel angularly disposed slots for permitting horizontal and vertical positioning of the assembly with respect to the support wall.

References Cited

UNITED STATES PATENTS

| | | | |
|---|---|---|---|
| 2,796,626 | 6/1957 | Gussack | 16—94 |
| 3,159,866 | 12/1964 | Kellems | 16—105 |
| 3,203,027 | 8/1965 | Ohman | 16—105 |
| 3,261,052 | 7/1966 | Galland | 16—97X |

FOREIGN PATENTS

| | | | |
|---|---|---|---|
| 404,905 | 7/1966 | Switzerland | 16—97 |

DONALD A. GRIFFIN, Primary Examiner